No. 607,703. Patented July 19, 1898.
J. P. PETERS.
DECORATIVE ATTACHMENT FOR WHEELS.
(Application filed June 19, 1897.)
(No Model.)
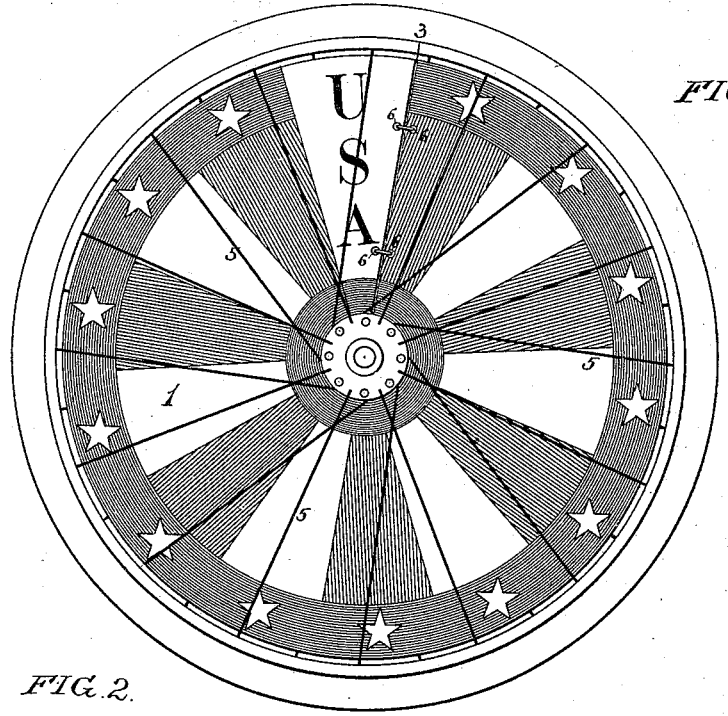
FIG. 1.
FIG. 2.
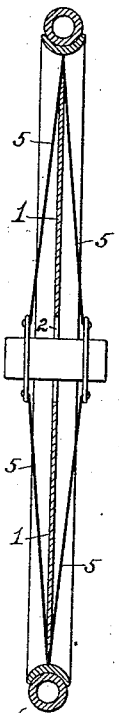
FIG. 3.
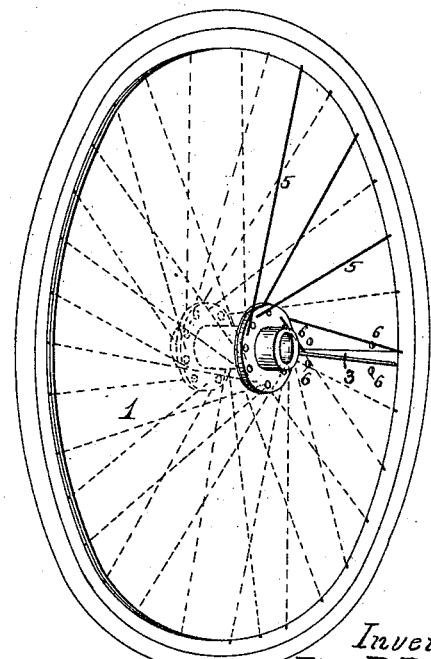
Witnesses:
Chas. De Cou.
F. E. Bechtold.
Inventor:
John P. Peters
By his Attorneys
Howson & Howson

UNITED STATES PATENT OFFICE.

JOHN P. PETERS, OF PHILADELPHIA, PENNSYLVANIA.

DECORATIVE ATTACHMENT FOR WHEELS.

SPECIFICATION forming part of Letters Patent No. 607,703, dated July 19, 1898.

Application filed June 19, 1897. Serial No. 641,516. (No model.)

*To all whom it may concern:*

Be it known that I, JOHN P. PETERS, a citizen of the United States, residing in Philadelphia, Pennsylvania, have invented certain Improvements in Decorative Attachments for Wheels, of which the following is a specification.

The object of my invention is to provide for the wheels of bicycles or other vehicles a decorative attachment which can be readily introduced between the opposite spokes of the wheel and which when inserted will occupy a central position in the wheel and will be properly retained in such central position, the decorative face or faces of the attachment being visible through the spaces between the spokes of the wheel.

In the accompanying drawings, Figure 1 is a side view of an ordinary bicycle-wheel with my decorative attachment applied thereto. Fig. 2 is a sectional view of the same; and Fig. 3 is a perspective view of the attachment, showing the method of applying the same to the wheel and also showing the attachment with a plain instead of with a decorated face.

The attachment consists of a disk 1 of circular, polygonal, or other exterior form and of such dimensions that it will fit easily within the rim of the wheel, the disk being made of cardboard or other material stiff enough to support itself when in place and having a central opening 2 from which to the outer edge of the disk extends an opening 3. The central opening 2 of the disk may be of any desired size or shape, but it is preferably circular, the outer portions of the disk at and near the rim being confined laterally by the spokes 5, which converge to the central line of the rim, as usual. Hence when inserted the disk is firmly retained in its proper central position in the wheel.

In order to insert the disk, the edges of the opening 3 are spread laterally apart, so that one edge can be passed between the spokes of the wheel, and the disk is then turned so as to introduce it between the opposite spokes, as shown in Fig. 3, the meeting edges of the disk after the insertion of the same being secured together in any available manner—as, for instance, by means of fastenings passing through eyelets 6 in the disk near each edge of the opening 3.

The opposite sides of the disk 1 may be decorated in any way which the taste of the manufacturer or the demand of the moment may suggest, the attachment, while giving the wheel the effect of a solid wheel of decorative character, being extremely light and capable of very ready application or removal. Hence it is available for use on special occasions without injury to the wheel or without causing any inconvenience to the rider.

If desired, the disk may be used for advertising purposes, or it may combine this with the decorative purpose.

Having thus described my invention, I claim and desire to secure by Letters Patent—

1. The within-described attachment for the wheels of vehicles, the same consisting of an annular disk of material, stiff enough to be self-supporting, the periphery of the disk being supported by the opposite spokes of the wheel where they approach each other at the rim, and said disk having a central opening large enough to permit the passage of the hub-collar, and an opening extending from said central opening to the outer edge of the disk, substantially as specified.

2. The within-described attachment for the wheels of vehicles, the same consisting of an annular disk of material stiff enough to be self-supporting, the periphery of the disk being supported by the opposite spokes of the wheel where the latter approach each other at the rim, and said disk having a central opening large enough for the passage of the hub-collar, and an opening extending therefrom to the outer edge of the disk, and having on opposite sides of the latter opening, means whereby the separated portions of the disk can be secured together, substantially as specified.

In testimony whereof I have signed my name to this specification in the presence of two subscribing witnesses.

JOHN P. PETERS.

Witnesses:
WILL. A. BARR,
F. E. BECHTOLD.